US007162596B2

(12) United States Patent
Popp et al.

(10) Patent No.: US 7,162,596 B2
(45) Date of Patent: Jan. 9, 2007

(54) REMOTE MIRRORED DISK PAIR RESYNCHRONIZATION MONITOR

(75) Inventors: Mathias Popp, Rocklin, CA (US); The Thanh Phan, Roseville, CA (US); Robert A Cochran, Rocklin, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 319 days.

(21) Appl. No.: 10/043,562

(22) Filed: Jan. 11, 2002

(65) Prior Publication Data

US 2003/0177323 A1    Sep. 18, 2003

(51) Int. Cl.
*G06F 12/06* (2006.01)

(52) U.S. Cl. ............................. 711/162; 711/156; 714/6
(58) Field of Classification Search ................ 711/161, 711/162, 165, 112, 114, 111, 170, 156; 714/6, 714/7, 11, 14
See application file for complete search history.

(56) References Cited

U.S. PATENT DOCUMENTS

| | | | | |
|---|---|---|---|---|
| 5,513,314 | A * | 4/1996 | Kandasamy et al. | 714/6 |
| 5,692,155 | A * | 11/1997 | Iskiyan et al. | 711/162 |
| 5,835,953 | A * | 11/1998 | Ohran | 711/162 |
| 6,035,412 | A * | 3/2000 | Tamer et al. | 714/6 |
| 6,052,797 | A * | 4/2000 | Ofek et al. | 714/6 |
| 6,260,124 | B1 * | 7/2001 | Crockett et al. | 711/162 |
| 6,477,591 | B1 * | 11/2002 | VanderSpek | 711/162 |
| 6,578,120 | B1 * | 6/2003 | Crockett et al. | 711/162 |
| 6,594,745 | B1 * | 7/2003 | Grover | 711/162 |

OTHER PUBLICATIONS

"EMC Ships Continuously-Available Disk-Based Disaster Recovery Solution," News from EMC Corporation, EMC Corporation, Hopkinton, Mass., Oct. 3, 1994, 4 pages [EMCP 00003923-8926].*

(Continued)

*Primary Examiner*—Pierre-Michel Bataille

(57) ABSTRACT

A system, apparatus and method permit automatic monitoring of mirroring conditions of a pair of storage units, such as a pair of disk arrays for example. Monitoring information may be initially stored; for the storage unit pair. A request is made to associated mirroring software, to obtain status information relating to the storage unit pair, based upon the stored monitoring information for example. Based upon the status information obtained, mirroring conditions of the storage unit pair can then be automatically monitored to determine the status of the mirroring process between the storage unit pair. In one embodiment, it can be determined whether or not the mirroring process between storage units of the pair has been suspended and if so, the mirroring process between units of the storage unit pair can be automatically resynchronized, in conjunction with the mirroring software. As such, a more automated monitoring of the storage unit pair can take place, and automatic resynchronization of any suspension of the mirroring process between storage units of the storage unit pair can occur.

31 Claims, 4 Drawing Sheets

U.S. PATENT DOCUMENTS

| | | | |
|---|---|---|---|
| 6,636,984 B1* | 10/2003 | McBrearty et al. | 714/6 |
| 6,643,667 B1* | 11/2003 | Arai et al. | 711/114 |
| 6,684,396 B1* | 1/2004 | Brittain et al. | 714/11 |
| 6,842,834 B1* | 1/2005 | Crockett et al. | 711/162 |
| 6,931,422 B1* | 8/2005 | Gusler et al. | 707/204 |
| 7,024,528 B1* | 4/2006 | LeCrone et al. | 711/162 |
| 7,055,059 B1* | 5/2006 | Yanai et al. | 714/7 |
| 2003/0126107 A1* | 7/2003 | Yamagami | 707/1 |
| 2003/0145168 A1* | 7/2003 | LeCrone et al. | 711/114 |
| 2004/0073831 A1* | 4/2004 | Yanai et al. | 714/7 |

OTHER PUBLICATIONS

"Symmetrix Remote Data Facility: Taking the disaster out of disaster recovery," Brochure, EMC Corporation, Hopkinton, Mass., Sep. 1994, 8 pages [EMCP 00003908-3915].*

Symmetrix Remote Data Facility (SRDF) Product Guide, P/N 200-999-554 Rev A, EMC Corporation, Hopkinton, Mass., Sep. 1994, 105 pages [EMCP 00003686-3791].*

Ousterhout et al., "Beating the I/O Bottlencek: A Case for Log-Structured File Systems," Operating Systems Review, vol. 23, No. 1, ACM Press Jan. 1989, pp. 11-28.*

* cited by examiner

REMOTE MIRRORED DISK PAIR RESYNCHRONIZATION MONITOR

FIELD OF THE INVENTION

This invention generally relates to storage devices and maintaining storage devices, and more preferably relates to maintaining storage device pairs.

BACKGROUND OF THE INVENTION

Physical disk space on storage devices, such as disk drives or disk arrays (grouped disk drives), is typically mapped to logical units of storage. Logical mapping can extend in many hierarchical levels. The smallest units can be grouped into logical volumes. Logical volumes can then be grouped further into volume groups, etc.

Application software references storage space on storage devices, such as disks drives and/or disk arrays, through these logical mappings. For high availability purposes, internal data mirroring software is typically used to create a duplicate copy of a volume group of a storage device, on a remote storage device such as a remote disk drive or disk array for example. The local volume and the remote volume pair is often referred to as a disk pair. A disk pair (which can include a pair of disk drives, a pair of disk arrays, etc.), or distinct grouping of disk pairs is typically known as a "resource".

Array-based mirroring software provides functionality to create, split, delete, and check the status of a disk pair or resource. At the present time, however, an actual person or administrator must monitor the status of the disk pair based upon the information provided by the mirroring software, to perform maintenance tasks necessary to maintain a consistent disk pair state. This is because, as problems occur, the mirroring process may be suspended or stopped and the state of the disk pair or resource is no longer consistent between the two storage devices or disc arrays of the pair. The inconsistent state must be detected and the disk pair must eventually be resynchronized by the administrator in order to restore data consistency. At the present time, this detection and repair process is predominantly a manual process.

FIGS. 1a and 1b generally illustrate a basic disk mirroring configuration. Typically, a local host 2 instructs data storage on a local disk drive or drive array 6, also referred to as a local primary array or volume. During normal operation, data from the local primary volume 6 is mirrored or copied to the remote secondary volume on a remote disk drive or array 8 in a known manner, by way of a private link 10 connecting primary volume 6 with remote volume 8. The remote host 4 is in contact with the local host 2, and is also in contact with the remote volume 8.

As shown in FIG. 1b, however, problems typically occur when the private link 10 connecting volumes 6,8 is out for some reason, for example, or if the private link mirroring process is otherwise suspended or stopped for some reason as indicated by element 20 in FIG. 1b, for example. This results in an interruption of the mirroring process and may result in inconsistent data being stored on the volumes 6,8. Again, the suspension or stoppage of the mirroring process could occur for any number of reasons, such as that of a temporary outage in the private link of the volumes, for example. Since these private links often utilize leased telecommunication lines (e.g., asynchronous transfer mode (ATM); Dense Wave Division Multiplexing (DWDM); T3; etc.) that go through a shared wide area network (WAN) infrastructure, temporary outages are not uncommon.

When these outages occur, existing mirroring software can report the outage by reporting the state of the disk drive or disk array or disk array pair. For exemplary purposes only, five general reportable categories of disk pair states may be as follows:

| | |
|---|---|
| Connected - | the disk arrays of the disk pair are in a connected state. Changes to the local volume or local disk array are being constantly sent to the remote or mirrored volume, or mirrored disk array. |
| Resync - | resynchronization is taking place (data is being copied out of order). |
| Suspended - | pairing (mirroring) has been suspended. As of the moment of this suspended operation, data in both disk arrays is the same. The disk pair could be restored to a connected state by resynchronizing the data. |
| Error Suspended - | pairing or mirroring is suspended due to a permanent error condition. Manual servicing by the administrator is typically done to return the disk pair to a known good state. |
| Deleted - | the disks are in a deleted mode (not mirrored or paired). |

Traditionally, the administrator monitors the status of the disk pair as reported by the mirroring software; and thus the monitoring of disk pair status, the detection of any interruption in the mirroring process and repair thereof, are predominately manual processes.

SUMMARY OF THE INVENTION

An apparatus, method and system have been created for automatically monitoring mirroring conditions of a pair of storage units, such as a pair of disks or disk arrays for example. Monitoring information can be stored, for the storage unit pair. A request is made to mirroring software, to obtain status information relating to the storage unit pair, based upon the stored monitoring information, or monitoring conditions for example. Based upon the status information obtained, mirroring conditions of the storage unit pair are then automatically monitored to determine the status of the mirroring process between storage units or the storage unit pair.

More preferably, whether or not the mirroring process between storage units of the pair has been suspended is determined; and if so, the mirroring process between units of the storage unit pair can be resynchronized, in conjunction with the mirroring software. As such, monitoring of the mirroring process between the storage unit pair can take place, and preferably automatic resynchronization of any suspension of the mirroring process between storage units of the storage unit pair can occur.

BRIEF DESCRIPTION OF THE DRAWINGS

The invention will be explained in more detail below, by way of example with reference to exemplary embodiments as illustrated in the drawings, wherein.

DETAILED DESCRIPTION OF THE PREFERRED EMBODIMENTS

Figure 1A:
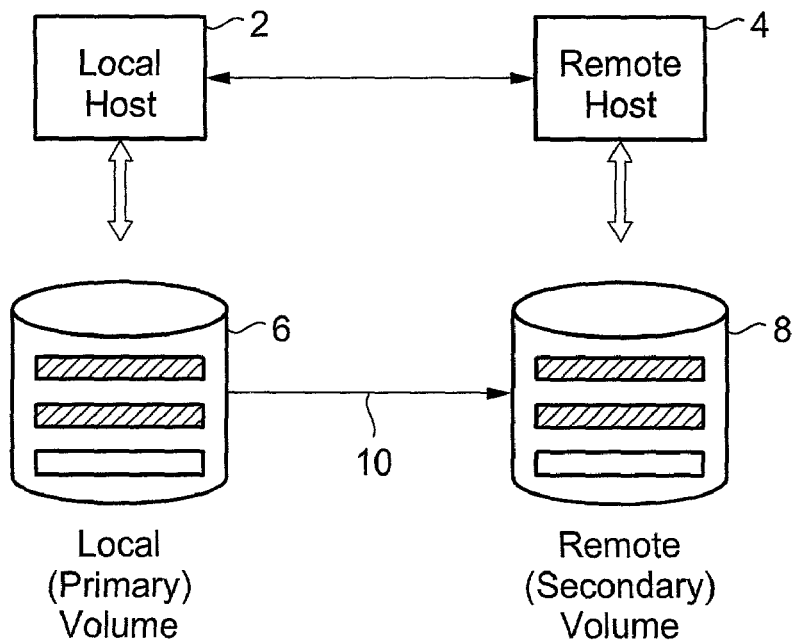
FIG. 1a illustrates a generic disk mirroring configuration.
Figure 1B:
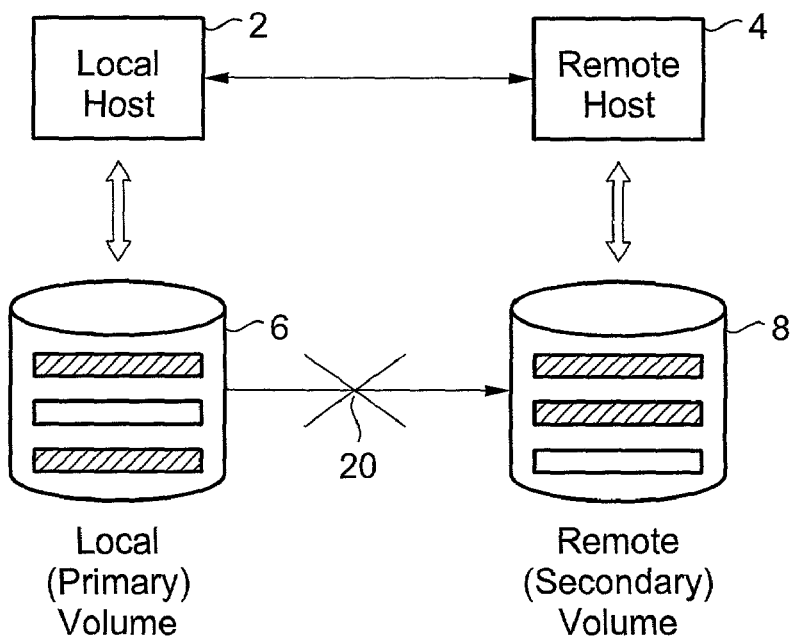
FIG. 1b illustrates the disk mirroring configuration of FIG. 1a wherein the mirroring process has been suspended or stopped.

A method, apparatus and system permit monitoring of mirroring conditions of a pair of storage units. The storage unit pairs can include paired disk drives, paired disk arrays, etc., but may include any type of paired storage devices. Monitoring information, including, for example, at least one of information identifying the storage unit pair, information identifying associated mirroring software, information identifying a monitoring interval, etc., can be stored (or can be otherwise accessible, such as on a real time basis, for example) for at least one, storage unit pair (including, a plurality of storage unit pairs). Based upon monitoring information for a particular storage unit pair (for example), the associated mirroring software is then requested to obtain status information relating to the specified storage unit pair. Based upon the status information received, mirroring conditions of the storage unit pair are then automatically monitored to determine the status of a mirroring process between units of a specified storage unit pair. Alternatively or in addition thereto, status information can indicate whether or not the mirroring process between units of the storage unit pair has been suspended. In response thereto, the mirroring process can be resynchronized, upon detecting that the mirroring process had been suspended. Further, automatic resynchronization may be enabled/disabled. For example, an auto recover flag may be used to indicate whether or not automatic resynchronization has been enabled.

Accordingly, the method, apparatus and system of the present application introduces an automated method for monitoring the status of a storage unit pair, such as a disk pair or disk array for example, and enables the performance of automatic resynchronization of the storage unit pair when appropriate. Thus, the latency time in manually detecting an abnormal pair state is eliminated by reporting an error condition, safeguarding against data inconsistency by automatically resynchronizing the disk pair when appropriate, and generally reducing the cost of human errors associated with known disk pair maintenance.

The system, apparatus and method of the present application can, in one embodiment, interface with mirroring software associated with a pair of storage units, in order to retrieve the disk array status, and to perform resynchronization of the storage unit pair if necessary. The mirroring software can provide a command line interface, an application programming interface (API), etc., which can be used to manage the storage unit pair to obtain status information relating to the storage unit pair in a known manner and, where appropriate, to resynchronize the storage unit pair. A command line interface can preferably include a set of commands provided by the mirroring software to permit management of paired storage devices through, for example, a type of terminal console. An application programming interface can include a set of commands provided by the mirroring software to permit management of paired storage devices programmatically.

The system, apparatus and method of the present application can be customized to work with any type of mirroring software for any type of paired storage devices; and thus descriptions of the interface between the system, apparatus and method of the present application and the mirroring software is only described at the conceptual level, for the sake of clarity and brevity. The concepts described herein can be adapted to any particular mirroring software being utilized, wherein stored monitoring information for a particular storage unit pair can indicate the particular mirroring software associated therewith.

Figure 2:
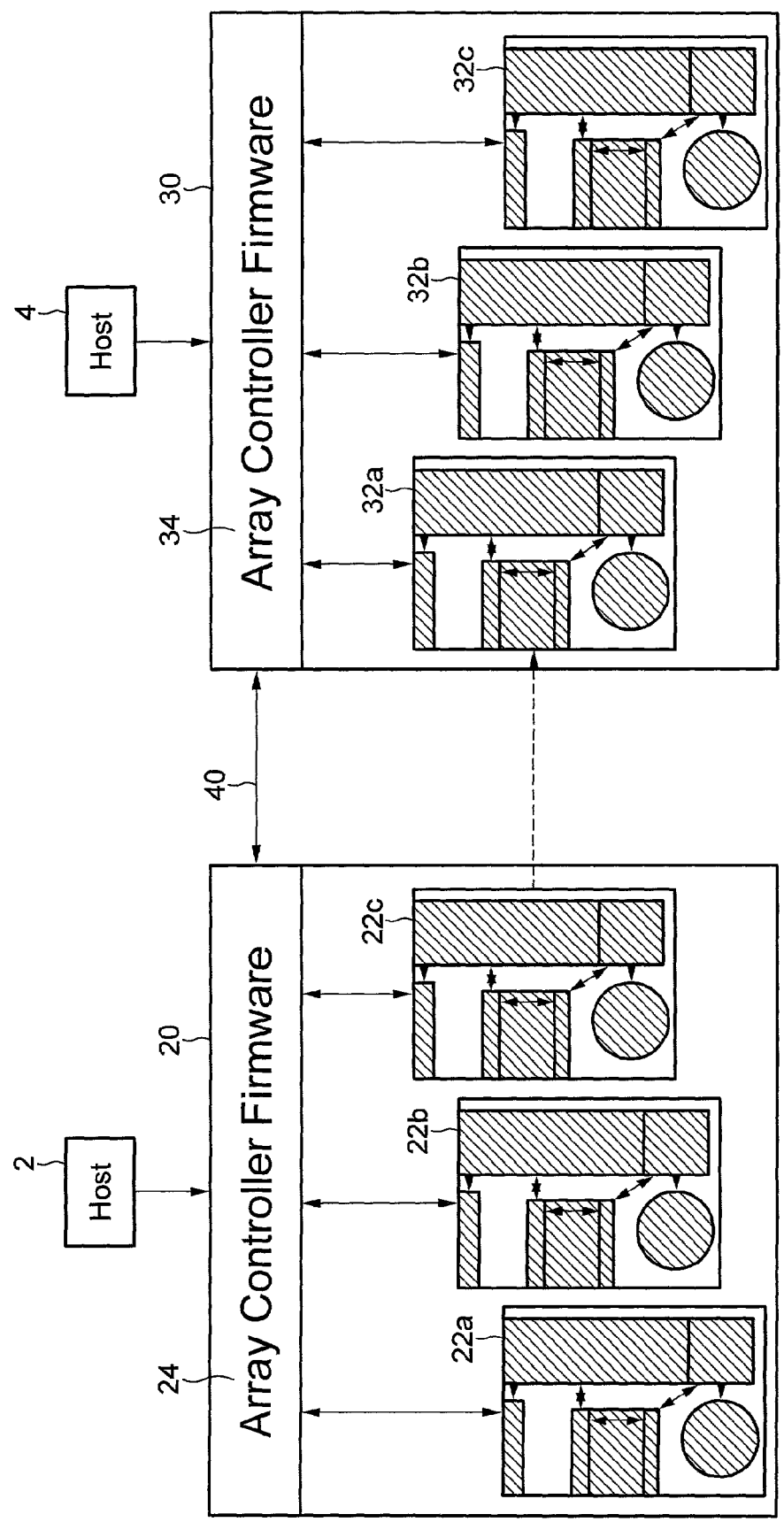
FIG. 2 illustrates generic disk array mirroring.

FIG. 2 of the present application is a generic diagram of disk array mirroring. A disk array 20 can be an aggregation of several disk drives 22A, 22B and 22C, sharing a common set of services, and can be in a common cabinet. A single host 2 can control a plurality of disk drives of a single disk array 20.

Array controller firmware 24 shown in FIG. 2 is a layer of logic and control which can be inserted between the disk drives 22A, 22B, 22C and the host 2. The disk array 20 aggregates the various disk drives in a known manner to provide a larger pool of storage along with some data reliability services (for example, RAID (Redundant Arrays of Inexpensive Discs), mirroring, etc.). It should be noted that the block generically labeled "array controller firmware 24", also may include cache memory, shared memory, disk controllers, data/control buses, etc., not shown.

Although not shown in FIG., 2, a disk array 20 may have many ports (such as a fiber-channel port, an SCSI port, etc.), and may be connected to a plurality of different hosts. Disk arrays 20 are typically used by many different hosts (computers). Some hosts will share ports, but most hosts will talk using their own private ports, or private logical units (LUNs), which may or may not reside on a disk drive used by another host. LUNs are logical units/areas of storage area available within a disk array, and there are typically no restrictions on which host may read from or write to a given LUN, unless LUN security is being employed. LUNs are not physical things, but are abstractions created from the storage space available on a disk drive. Cache memory (also not shown in FIG. 2 for the sake of brevity), will typically serve as a high speed, semiconductor memory staging area for data. Read requests for data which have been recently read from a disk are called "read hits" and can be provided directly/quickly from a cache without a disk drive access operation. A read operation supplied from a cache is much faster than that of a normal disk read operation.

Since LUNs are virtual extractions, the pointers can sometimes be changed so that the same LUN number now points to a different physical disk (with the data automatically copied over). This feature, is sometimes used, for example, to speed up an application that was using slower disks when faster disks are available within the array. In any event, each of the these various aspects, although not shown or described in detail, can be used in storing information in a disk array 20.

Referring back to FIG. 2, a first primary disk array 20 is illustrated, connected to a second remote mirrored disk array 30. The disk array 20 and the mirrored disk array 30 may be connected via a private link 40, such as a private optical link for example. The two disk arrays 20 and 30 form a storage unit pair or "resource", and need not be located physically close to one another. Disk arrays can mirror one another and can mirror LUNs, across a great distance, such as several kilometers, for example. In addition, some or all disks of a disk array may be part of a mirrored pair. Thus, for the purpose of the present application, a storage unit pair can include any pair of storage devices including but not limited to a primary and a mirror disk pair, such as 22C and 32C of FIG. 2, for example, a primary array 20 and a mirror array 30, as shown in FIG. 2 for example, etc.

Accordingly, FIG. 2 illustrates storage unit pair mirroring, an exemplary form of mirroring of a primary disk array 20 and a remote mirror disk array 30, wherein the remote mirror disk array 30 similarly may include array controller firmware 34, a plurality of disk drives 32A, 32B and 32C; etc. The remote or mirrored disk array 30 can be connected to a second host 4 in a manner somewhat similar to that previously described.

A write request involving both the primary array 20 and the mirrored disk array 30 generally operates as follows. Initially, the request arrives at array 20 from host 2, and is placed in a request buffer. It may contain an identification of the requester, the location to be written, the length of the data, and the data itself, for example. The internal drive firmware 24 then examines the request. In addition to sending the immediate response back to the host 2 conveying "I finished your request", and in addition to placing a write request on an internal "to do" i/o queue so that the data will eventually be written to a disk 22a, 22b, 22c of the disk array 20; the write request is also sent to the mirror disk array 30 via the private optical link 40. The write request is the same as that provided by host 2. The disk array 20 then waits for a reply and when received, the mirror array treats the write request just like a normal write request from its host 4. At the time that the mirroring array 30 is writing the mirrored request, however, its host 4 is only allowed to read all the disk drives in the mirrored state. Writes are only accepted from the dominate or primary array 20.

As previously stated, in connection with disk array mirroring of a disk pair as shown in FIG. 2 for example, mirroring software currently exists which can report of the mirroring conditions of the storage unit pair. The mirroring software can report different mirroring states such as connecting, resync, suspended, error-suspend and deleted, for example. Such mirroring software is generally illustrated in FIG. 3 for example, by element 120.

Figure 3:
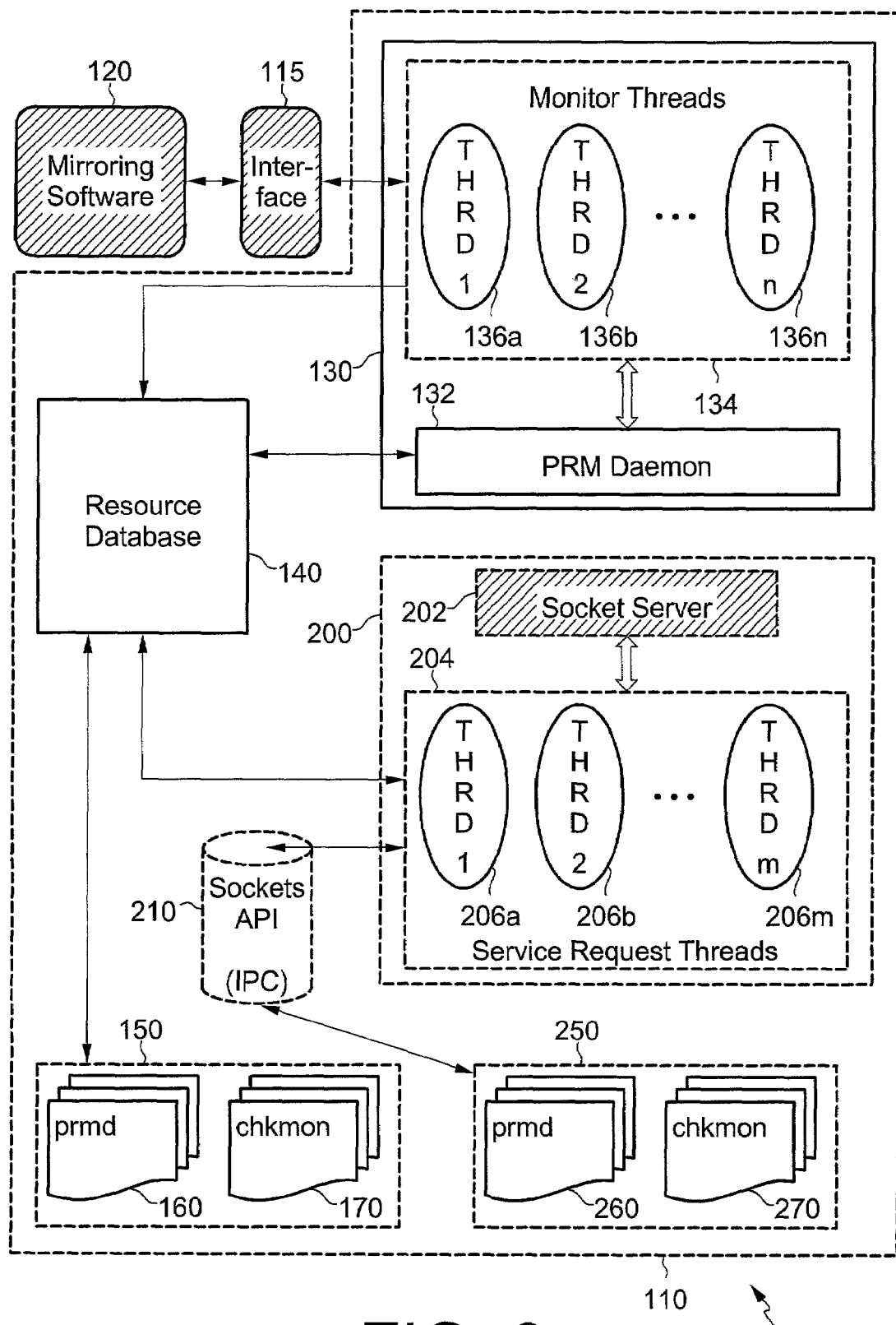
FIG. 3 illustrates an apparatus and system for monitoring mirroring conditions of a pair of storage units.

The system of the present application, in one embodiment, can generally be identified as a mirroring software system 100, including mirroring software 120 for example, which has been adapted to obtain status information on mirroring conditions of pairs (at least one pair) of storage units; and apparatus 110 adapted to monitor mirroring conditions of a pair of storage units in conjunction with the mirroring software 120, as shown in FIG. 3 of the present application, for example. The apparatus 110, through an interface 115 for example, can request and receive monitoring information relating to a particular storage unit pair. In certain instances, it can correct mirroring problems among the storage units of the storage unit pair.

The apparatus 110 includes a database 140, adapted to store monitoring information for a storage unit pair (for a plurality of storage unit pairs, for example); and a control unit 130, operatively connected to the database 140 and mirroring software 120, and adapted to request status information from the mirroring software and monitor mirroring conditions of the storage unit pair. It should be noted that mirroring software 120 provides information that can be called or polled, for example. Further, mirroring software 120 as shown FIG. 3 is merely illustrative, as the apparatus 110 could be connected to a plurality of many different types of mirroring software for one or many different storage unit pairs, wherein the database can indicate an association to control unit 130, between a particular storage unit pair and particular mirroring software.

The control unit 130 includes a controller which can be known as, for example, a pair resync monitor (PRM) daemon 132. This aspect of the control unit 130 is used to continuously automatically monitor the resource or storage unit pair status in conjunction with resource database 140. "Daemon" generally refers, for example, to a persistent process which runs continuously, such as a type of autonomous process.

The PPM daemon 132 can be started as part of a start up service or with a first invocation of a pair resync monitor daemon interface (PRMD) 160. This is merely an implementation decision and is dependent upon the operating system platform chosen. If the PPM daemon 132 is created with the first invocation of the PPMD 160 to be described hereafter, then to prevent each invocation of PRMD from creating a separate daemon process, a locking mechanism is preferably used to coordinate this process. The locking mechanism generally provides a deterministic method for determining whether a PPM daemon is already active, or is in the process of becoming active.

If a PRM daemon 132 is not already active, then the current process may acquire the lock and along with it, the right to create a new instance of the PRM daemon 132. After creating the new PRM daemon 132, a resource can be added to the resource database 140. If the PRM daemon 132 is already active, a PRMD command from the PRMD interface 160 can be used to add the new resource or storage unit pair to the resource database 140, as will be described hereafter.

The PRM daemon 132, in one embodiment, may maintain a list of registered resources or storage unit pairs in resource database 140. Each item in the list may be maintained as a data structure that can include, for example, one or more of: identification information identifying the resource or storage unit pair, information identifying associated mirroring software, information identifying a monitor interval, and/or other operating parameters and status data that can be used in monitoring the resource or storage unit pair. An exemplary template data structure, which includes one or more of the following items, is given below:

```
struct ObjectItem {
    char        pAppName_[];
    char        pInstance_[];
    char        pDeviceGroup_[];
    int         iInterval_[];
    char        pResync_[];
    time_t      tStartTime_;
    int         iTimeRemain_;
    int         iPVol_;
    Int         iSVol_;
};
```

| | |
|---|---|
| pAppName_ | Name of application using this resource. |
| pInstance_ | Identification information specific to the mirroring software used. |
| pDeviceGroup_ | Resource name. |
| iInterval_ | Monitor interval in seconds. |
| pResync_ | Indicates whether an automatic resynchronization is to be performed (autorecover flag) |
| tStartTime_ | Timestamp used in the monitoring algorithm. |
| tTimeRemain_ | Timestamp used in the monitoring algorithm. |
| iPVol_ | Primary volume status. |
| iSVol_ | Secondary volume status. |

The control unit 130 can include the PRM daemon 132 along with a monitoring algorithm 134. The PRM daemon 132 can run the monitoring algorithm 134 to determine when resources need to be polled through associated mirroring software, for status. The algorithm may utilize time or monitor interval information, stored in each data structure for each resource in resource database 140 for example, to determine if the resource is due for polling. Thereafter, the time information may be updated accordingly. For resources that are due for polling, the PRM daemon 132 can then request the status for each resource from associated mirroring software 120 through the monitoring algorithm 134, including monitoring threads 136A, 136B, . . . 136N.

Retrieving status from the associated mirror software 120 can take an extended amount of time. Most programming languages provide system calls that permit the programmer to create multiple sub-processes called "threads" that run concurrently as part of the process. Hence, as is shown in one preferred embodiment of FIG. 3 of the present application, for example, the PRM daemon 132 can create a separate "monitor" thread to perform the polling (and even to perform resynchronization for example) for each resource requesting or requiring polling, based upon information stored in the resource database 140. These separate "monitor" threads may run simultaneously such that while one thread waits for a resource status, other threads continue to process other resources.

The monitor thread created, such as thread 136A, 136B, and 136N as shown in FIG. 3 for example, is responsible for interfacing with the associated mirroring software, such as mirroring software 120 for example, through an interface such as interface 115 for example. As previously explained, interface 115 can be a common line or application programming interface, for example. More specifically, the monitor thread 136A–N is responsible for performing and executing commands used to monitor and resynchronize (if appropriate) the resource in conjunction with information stored in resource database 140 and in conjunction with PRM daemon 132. When the monitor thread successfully receives status information for the resource from the mirroring software 120, the status information is used to update the data structure of the resource stored in the resource database 140 with the latest status.

The status of the resource or storage unit pair is stored in resource database 140 and is used to determine the next course of action. If the status is good, no further action is necessary. However, if errors, mirroring process suspensions, etc., are detected, further action may be taken. Pair error conditions can be reported and/or logged in resource database 140. If the status indicates a pair suspended condition, this can lead to automatic pair resynchronization, for example. Alternatively, it can lead to pair resynchronization based upon whether or not a flag is set, for example, based upon an autorecover flag being set. Such an autorecover flag can permit additional control over the automatic resynchronization option and can preferably be set through the command line interfaces, for example.

The control unit 130 may not only monitor mirroring conditions of the storage unit pair, but also may determine whether or not the mirroring process between storage units of the storage unit pair is suspended. In one embodiment, if it is determined that the mirroring process between storage units of the storage unit pair is suspended (and if it is determined that automatic synchronization is enabled, by setting of the autorecover flag associated with the storage unit pair for example, if necessary) resynchronization of the mirroring process then occurs between units of the storage unit pair in conjunction with the associated mirroring software.

The control unit 130 can operate in conjunction with associated mirroring software 120, and in conjunction with the resource database 140. The resource database 140 is a repository for a list of resources (disk or storage unit pairs) being monitored, and can store associated data and status information. The resource database 140 is a self-contained object providing an application programming interface (API) for those processes wishing to manipulate the resource list and resource data. The specific implementation of the database 140 can occur in many different ways, each of which is encompassed within the present application, and may be left up to the programmer/developer.

As previously stated, the resource database 140 can include a separate data structure for each storage unit pair or resource. The resource database, in one embodiment, includes one or more of the following exemplary application programming interface (API) routines:

```
bool getPid (int& riPid_out);
// Retrieves the PRM process identifier.
//riPid_out - set to the PRM's process identifier
bool getTimeMark (time_t& rtTimeMark_out);
// Retrieves the Resource Database timestamp. This timestamp is an
indication of the currency of the Resource Database for
implementations which requires this data.
// rtTimeMark_out - Resource Database timestamp.
bool addOneObject (ResourceObject& rObj_in);
// Adds one resource to the Resource Database.
// rObj_in - Resource to be added to Resource Database
bool addObjectList (ResourceObjectList& rObjList_in);
// Adds a list of resources to the Resource Database.
// rObjList_in - List of resources to be added to Resource Database
bool changeOneInterval (ResourceObject& rObj_in);
// Changes the monitor interval for a particular resource
// rObj_in - The resource's structure with the new monitor interval
bool changeAllInterval (    ResourceOjbect&      rObj_in,
                            ResourceObjectList&  rObjList_out);
// Updates all resources with the specified monitor interval.
// rObj_in - Structure specifying the new monitor interval
// rObj_out - List of updated resources
bool showOne (ResourceObject& rObj_in);
// Display the monitoring parameters and disk status for the specified
resource
// rObj_in - Resource to display
bool showAll (ResourceObjectList& rObjList_out);
// Display the monitoring parameters and disk status for all resources.
// rObjList_out - List of all resources in Resource Database
bool removeOne (ResourceObject& rObj_in);
// Remove the specified resource from the Resource Database.
// rObj_in - Resource to be removed
bool removeAll (ResourceObjectList& rObjList_out);
// Remove all resources from the Resource Database and shutdown PRM.
// rObjList_out - List of resources that were removed from Resource
Database.
bool setAutorecover (ResourceObject& rObj_in, const char *autorecover);
// Sets the autorecover flag to the specified value.
// rObj_in - Sets the autorecover flag for this resource.
// autorecover - New value for autorecover flag
```

All API routines listed above can return TRUE for successful and FALSE for failure, for example.

As shown in FIG. 3, one or more interfaces may be included within the apparatus 110 of the system 100. The interface 150 can include a pair of resync monitored daemon interface (PRMD) 160 and a check monitor utility interface (chkmon) 170. The PRMD interface 160 is an exemplary first command line interface utility which is used to add resources to resource database 140. Other PRM operations can be achieved through the chkmon command line interface 170, if one is present. Of course, a single interface can be used to perform each of the aforementioned functions.

Some exemplary syntax for the PRMD interface 160 is as follows:

```
prmd    -n      application_name
        -g      device_group
        -i      instance
        -t      monitor_interval
        -r      autorecovery_mode
        -[u|d]  file_name
```

-continued

Flags:

- -n application_name
  Name of application using this resource.
- -g device_group
  Resource name.
- -i instance
  Identifying information associated with the mirroring software
- -t monitor_interval
  Monitor interval in seconds.
- -r autorecovery-mode
  Enable/disable autorecovery function. Where autorecovery_mode can be, for example, yes to enable autorecovery or no to disable autorecovery.
- -u file_name
  Add the resource(s) listed in the specified file to the Resources Database.
- -d file_name
  Save the current Resource Database to the specified file.

Return Codes:

| | |
|---|---|
| 0 | Successful; resource is added to PRM list |
| 10 | Internal error; resource may or may not have been added to Resource Monitor list. Should use chkmon to check status. |

For example:

prmd-n App1-g app1_vg-i 101-t 30-r yes can add the resource group app1-vg to the Resource Database with a monitoring interval of 30 seconds and with the autorecover flag set.

prmd-d myconfig can save (download) the current Resource Database to the file "myconfig"

prmd-u myconfig can add all resources listed in the file "myconfig" to the Resource Database An additional command line interface utility can include the chkmon interface 170, to permit added interactions (as opposed to additions) with the control unit 130. The utility of the chkmon interface 170 can allow the user to, for example, remove resources from the list of the resource database 140, check if a resource is being monitored, display a list of resources, update monitoring parameters associated with the resource, etc. Some exemplary syntax for the chkmon interface 170 is as follows:

```
chkmon    [-n application_name -g device_group]
          [-t monitor_interva]l
          [-a autorecover_mode]
          [-remove [-force]]
          [-show]
          [-pid]
```

Flags:

- -n application_name
  Name of application using this resource.
- -g device_group
  Name of resource.
- -t monitor_interval
  Updates resource(s) with new monitor_interval (in seconds).
- -a autorecovery-mode
  Enable/disable autorecovery for registered resource. Where autorecovery_mode can be yes to enable autorecovery or no to disable autorecovery.
- -show  Show resource(s) currently monitored.
- -pid   Returns the process id of the PRM daemon.
- -remove Remove resource(s) from the PRM list.
- -force Disable user confirmation for -remove flag.

Return Codes:

| | |
|---|---|
| 0 | Operation successful OR resource is in PAIR state |
| 1 | Resource is not in PAIR state |
| 2 | Resource group does not exist in monitored list |
| 3 | prmd not running |
| 10 | Internal error |
| 100 | Mirroring software reported error |

For example:

chkmon-n App1-g app1_vg-t 60 can update resource app1_vg monitor interval to 60 seconds.

chkmon-n App1-g app1_vg-remove-force can remove the resource group app1_vg from the Resource Database.

chkmon-show can list all resources currently monitored (i.e., registered in the Resource Database) by the Pair Resync Monitor.

The -t, -show, -a, -remove and -pid may be mutually exclusive. That is, only one of the above option flags may be specified at a time and any one flag cannot be used in combination with another.

The -t, -show and -remove options can be specified with or without the -n and -g options. If -n and -g options are specified, then only the specified resource may be shown, removed or updated. If the -n and -g options are not given, then the operation can apply to all resources in the Resource Database 140.

In one embodiment, not all return codes from chkmon are applicable to all operations. Table 1.0 below shows one example of a chkmon return code being associated with which operation, where "X" indicates that a given return code can occur when using that command.

TABLE 1.0 chkmon return codes and associated operations

| Operation | Return Code | | | | | |
|---|---|---|---|---|---|---|
| | 0 | 1 | 2 | 3 | 10 | 100 |
| SHOW (-n -g -show) | X | X | X | X | X | X |
| SHOWALL (-show) | X | — | — | X | X | — |
| REMOVE (-n -g -remove) | X | — | X | X | X | — |
| REMOVEALL (-remove) | X | — | — | X | X | — |
| CHANGE (-n -g -t) | X | — | X | X | X | — |
| CHANGEALL (-t) | X | — | — | X | X | — |
| START (-a yes) | X | — | X | X | X | — |
| STOP (-a no) | X | — | X | X | X | — |

Finally, FIG. 3 also indicates other optional components of the apparatus 110, including the optional socket control unit 200, which itself includes socket server 202 and the service request threads 204, including threads 206A, 206B, . . . 206M.

Local chkmon and secondary PRMD processes can interact directly with the resource database 140 through its API, for example. For distributed processes and network environments, a separate control unit 200 with a socket server 202 can be used, for listening on a named socket for service requests, for example. Such a socket server 202 can permit operations to be run remotely and permits storage unit pair status to be obtained remotely. Thus, for example, chkmon can be run remotely through socket server 202 to remotely determine what storage unit pair status is being monitored.

Once a request is detected, the socket server 202 can create a separate "service request" thread (206A–206M) to service the request, in a manner similar to the creation of monitor threads by control unit 130. Servicing the request can include, for example, reading data from the socket, formatting data into a proper structure, performing a requested operation and sending data back, etc.

A socket request may send a data structure similar to the structure maintained in the resource database 140 for example, and may include an addition of a small msgType element. An exemplary template structure syntax is as follows:

```
struct socketMessage {
    int         msgType;
    char        appName[];
    char        instance[];
    char        deviceGroup[];
    int         interval;
    char        resync[];
    int         pVol;
    int         sVol;
};
``` msgType contains the operation type. Operations allowed may include, for example:

| | |
|---|---|
| ADD | Add a resource to the PRM list to be monitored. |
| CHANGE | Update a resource already in the PRM list with new monitoring parameters |
| CHANGEALL | Update all resources in the PRM list with new monitoring parameters |
| SHOW | Display a resource's monitoring parameters and disk status |
| SHOWALL | Display all resources |
| REMOVE | Remove the specified resource from the PRM list |
| REMOVEALL | Remove all resources from the PRM list and shutdown the PRM daemon |
| STOP | Change the autorecovery flag to not perform autorecovery |
| START | Change the autorecovery flag to perform autorecovery |
| GETPID | Return the process id for the PRM daemon |

As such, the socket server 202 can permit an operator on one host/system to run chkmon for example, and/or obtain information about resources being monitored on another host/system.

Figure 4:
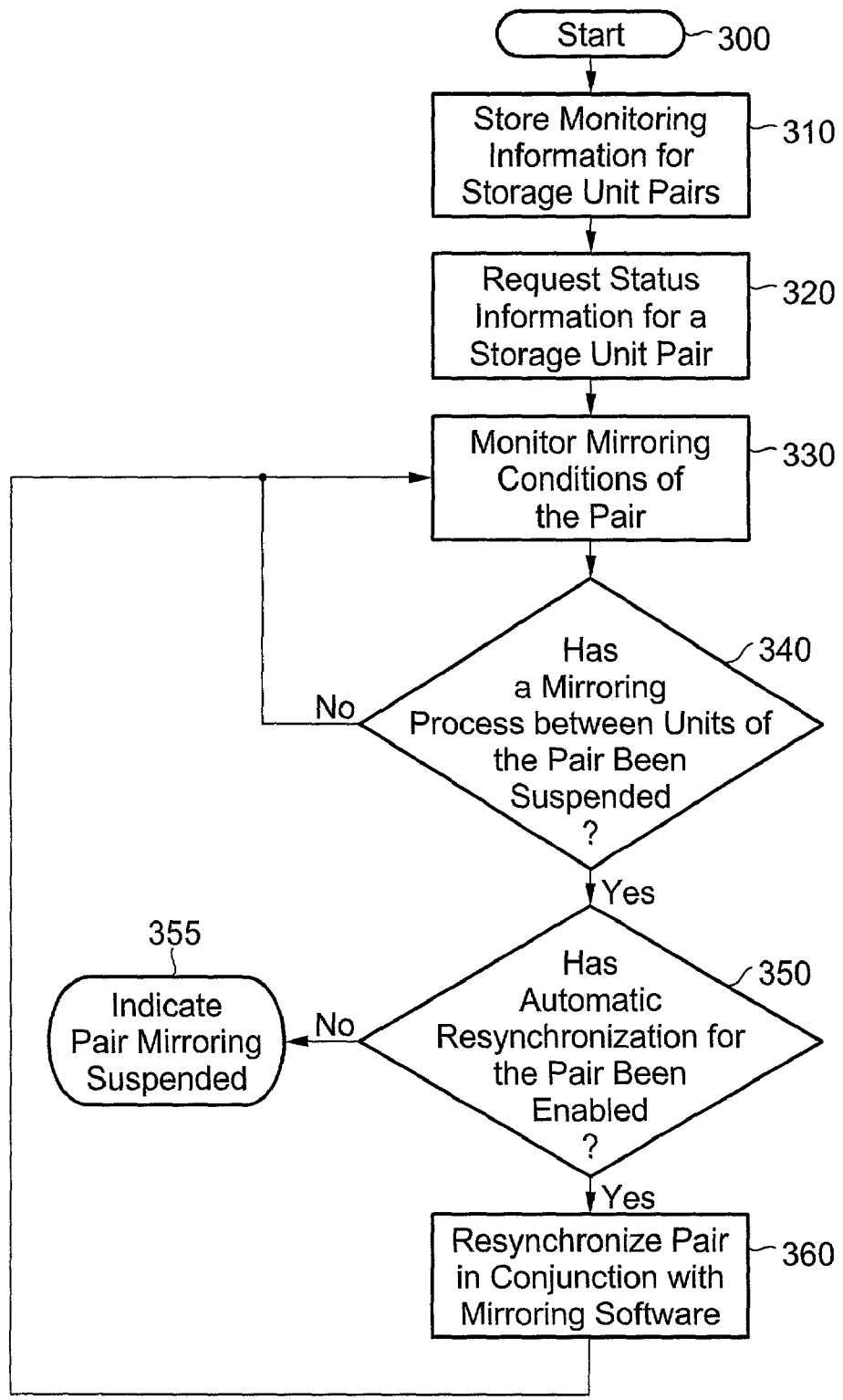
FIG. 4 illustrates a flow chart of a method for mirroring conditions of a pair of storage units.

FIG. 4 provides one exemplary embodiment of the methodology of the present application. Initially, the process is started in step 300. Thereafter, in step 310, monitoring information for at least one storage unit pair may be stored. This monitoring information can include information identifying at least one of the storage unit pair, information identifying associated mirroring software, information identifying a monitor interval, etc. It should be noted that such information may be stored in a resource data base 140 as indicated in FIG. 3, and may be stored for a plurality of storage unit pairs or resources, or may be unstored and accessed on a real-time basis.

Based upon information relating to the storage unit pair, status information is then requested and obtained by control unit 130 for a particular storage unit pair, as indicated in step 320 of FIG. 4. The control unit 130 can, for example, determine the associated mirroring software based upon the information stored in resource database 140 for the storage unit pair, and can then request and obtain status information for the storage unit pair based upon the stored monitoring interval information, for example.

Thereafter, in step 330, mirroring conditions of the storage unit pair are automatically monitored based upon status information obtained. In step 340, it can then be determined whether or not a mirroring process between units of the pair has been suspended. If not, the process returns to step 330, wherein mirroring conditions of the pair are monitored. If so, however, the process may move to step 350, wherein it can be determined whether or not automatic resynchronization for the pair has been enabled (if necessary). This can include an indication, for example, of whether or not the monitoring information for the storage unit pair includes an autorecover flag indicating whether or not automatic resynchronization has been enabled. If not, the process moves to step 355 where it is indicated, in some manner, that the mirroring process has been suspended. For example, the disk pair status (suspended) is saved to the resource database 140 to indicate that the storage unit pair is suspended.

However, if automatic resynchronization for the storage unit pair has been enabled (or if it is to be automatically performed irrespective of enablement), the process moves to step 360 where the storage unit pair is resynchronized in conjunction with the mirroring software. This may be achieved by calling the software command of the mirroring software, for resynchronizing the storage unit pair (through a command line or application programming interface, for example). Also, the monitoring "thread" that issues the resynchronization command can wait until the storage unit pair is resynchronized, and can then update the storage unit pair status in the resource database 140.

Thus, upon determining that the mirroring process between units of the storage unit pair has been suspended, and upon determining that automatic resynchronization has been enabled, the mirroring process between units of the storage unit pair can be automatically resynchronized in step 360 in conjunction with the mirroring software. Thereafter, the process can return to monitoring in step 330, noting that the storage unit pair has been automatically resynchronized. As such, automatic resynchronizing of a resource or a pair of storage units can automatically be conducted.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. A method for monitoring mirroring conditions of at least one of a pair of storage units, comprising:

providing a machine-actionable memory having one or more machine-actionable records arranged according to a data structure, the data structure including at least one status field the contents of which are indicative of the status of a mirroring process of the at least one storage unit pair, respectively;

requesting status information relating to the at least one storage unit pair from mirroring software associated therewith;

receiving the requested status information; and automatically updating the at least one status field of the machine-actionable memory based upon the requested status information.

2. The method of claim 1 further comprising:

resynchronizing, in conjunction with the mirroring software, the mirroring process between units of the storage unit pair, upon determining that the mirroring process between units of the storage unit pair has been suspended.

3. The method of claim 2, wherein resynchronization occurs only upon determining that automatic resynchronization of the storage unit pair has been enabled.

4. The method of claim 3, wherein the data structure further includes a field representing an autorecover flag, indicating whether or not automatic resynchronization has been enabled.

5. The method of claim 1, wherein the data structure further includes at least one field representing at least one of information identifying the storage unit pair, information identifying associated mirroring software, and information identifying a monitor interval, respectively, and wherein the step of requesting includes requesting associated mirroring software to obtain status information, based upon a stored monitor interval.

6. The method of claim 5 further comprising:

resynchronizing, in conjunction with the mirroring software, the mirroring process between storage units of the storage unit pair, upon determining that the mirroring process between storage units of the storage unit pair has been suspended, and upon determining that automatic resynchronization of the storage unit pair has been enabled.

7. The method of claim 6, wherein the data structure further includes a field representing an autorecover flag, indicating whether or not automatic resynchronization has been enabled.

8. The method of claim 1, wherein the machine-actionable memory includes instances of the data structure for a plurality of storage unit pairs, respectively, and wherein status information for each storage unit pair is requested, and mirroring conditions of each storage unit pair are monitored.

9. The method of claim 8, wherein the data structure further includes at least one field representing at least one of information identifying a storage unit pair, information identifying associated mirroring software, and information identifying a monitor interval, respectively, and wherein the step of requesting includes requesting associated mirroring software to obtain status information, based upon a stored monitor interval.

10. The method of claim 9, wherein the monitoring information for each of a plurality of storage unit pairs is stored in a database.

11. The method of claim 9, wherein the stored monitoring information is variable.

12. The method of claim 9, wherein monitoring information for a storage unit pair can be added to the database.

13. The method of claim 1, wherein the stored monitoring information for the at least one storage unit pair is remotely monitorable.

14. The method of claim 1 further comprising:

automatically determining from the updated at least one status field of the machine-actionable memory whether the at least one storage unit pair is in a suspended condition.

15. A method for monitoring mirroring conditions of at least one of a pair of storage units, comprising:

providing a machine-actionable memory having one or more machine-actionable records arranged according to a data structure, the data structure including at least one status field the contents of which are indicative of the status of a mirroring process of the at least one storage unit pair, respectively;

requesting status information relating to at least one storage unit pair from mirroring software associated therewith;

receiving the requested status information;

automatically updating the at least one status field of the machine-actionable memory based upon the requested status information; and automatically determining from the updated at least one status field of the machine-actionable memory whether the mirroring process between storage units of the storage unit pair has been suspended; and resynchronizing, in conjunction with the mirroring software, the mirroring process between units of the storage unit pair, upon determining that the mirroring process between storage units of the storage unit pair has been suspended.

16. The method of claim 15, wherein resynchronization occurs only upon determining that automatic resynchronization of the storage unit pair has been enabled, and wherein the data structure further includes an autorecover flag, indicating whether or not automatic resynchronization has been enabled.

17. The method of claim 15, wherein the data structure includes at least one field representing at least one of information identifying the storage unit pair, information identifying associated mirroring software, and information identifying a monitor interval, respectively.

18. An apparatus for monitoring mirroring conditions of a pair of storage units, comprising:

a database, adapted to store monitoring information for at least one storage unit pair and arranged at least in part according to a data structure, the data structure including at least one status field the contents of which are indicative of the status of a mirroring process of at least one storage unit pair, respectively; and a control unit, operatively connected to the database and mirroring software for the at least one storage unit pair, adapted to request status information relating to the at least one storage unit pair from mirroring software associated therewith, to receive the requested status information, and to automatically update the at least one status field of the data structure based upon the requested status information.

19. The apparatus of claim 18, wherein the database is adapted to store at least one of information identifying the storage unit pair, information identifying associated mirroring software, and information identifying a monitor interval.

20. The apparatus of claim 18, wherein the database includes instances of the data structure for a plurality of storage unit pairs, respectively, and wherein status information for each storage unit pair is requested, and mirroring conditions of each storage unit pair are monitored.

21. The apparatus of claim 20, further comprising:
an interface, operatively connected to the database, for adding monitoring information for additional pairs of storage units.

22. The apparatus of claim 18, further comprising:
an interface, operatively connected to the database, for varying stored monitoring information.

23. The apparatus of claim 18 wherein the control unit further is operable to:
automatically determine from the updated at least one status field of the machine-actionable memory whether the at least one storage unit pair is in a suspended condition.

24. The apparatus of claim 23, wherein the control unit is further adapted to resynchronize, in conjunction with the mirroring software, the mirroring process between units of the storage unit pair, upon determining that the mirroring process between units of the storage unit pair has been suspended.

25. The apparatus of claim 23, wherein the control unit is adapted to resynchronize only upon determining that automatic resynchronization of the storage unit pair has been enabled.

26. The apparatus of claim 25, wherein the data structure further includes a field representing an autorecover flag, indicating whether or not automatic resynchronization has been enabled.

27. An apparatus for monitoring mirroring conditions of a pair of storage units, comprising:
a database, adapted to store monitoring information for at least one storage unit pair and arranged at least in part according to a data structure, the data structure including at least one status field the contents of which are indicative of the status of a mirroring process of at least one storage unit pair, respectively; and
a control unit, operatively connected to the database and mirroring software for at least one storage unit pair, adapted to request status information relating to the at least one storage unit pair from mirroring software associated therewith, to receive the requested status information, to automatically update the at least one status field of the data structure based upon the requested status information, to automatically determine the status of a mirroring process from the updated at least one status field of the data structure, and adapted to resynchronize in conjunction with the mirroring software, the mirroring process between storage units of the storage unit pair, upon determining that the mirroring process between storage units of the storage unit pair has been suspended and upon determining that automatic resynchronization of the storage unit pair has been enabled.

28. A system for monitoring mirroring conditions of at least one pair of storage units, comprising:
a mirroring software system, adapted to automatically obtain status information on mirroring conditions of the at least one pair of storage units; and
an apparatus, adapted to automatically monitor mirroring conditions of the at least one pair of storage units in conjunction with the mirroring software system, the apparatus including,
a database, adapted to store monitoring information for the storage unit pair and arranged at least in part according to a data structure, the data structure including at least one status field the contents of which are indicative of the status of a mirroring process of at least one storage unit pair, respectively, and
a control unit, operatively connected to the database and mirroring software for the pair of storage units, adapted to request status information relating to the at least one storage unit pair from the mirroring software system, to receive the requested status information, and to automatically update the at least one status field of the data structure based upon the requested status information.

29. The system of claim 28 wherein the control unit further is operable to:
automatically determine from the updated at least one status field of the machine-actionable memory whether the at least one storage unit pair is in a suspended condition.

30. The system of claim 29, wherein the control unit is further adapted to resynchronize, in conjunction with the mirroring software, the mirroring process between units of the storage unit pair, upon determining that the mirroring process between units of the storage unit pair has been suspended.

31. The system of claim 29, wherein the control unit is adapted to resynchronize only upon determining that automatic resynchronization of the storage unit pair has been enabled.

* * * * *

UNITED STATES PATENT AND TRADEMARK OFFICE
CERTIFICATE OF CORRECTION

PATENT NO. : 7,162,596 B2  Page 1 of 1
APPLICATION NO. : 10/043562
DATED : January 9, 2007
INVENTOR(S) : Mathias Popp et al.

It is certified that error appears in the above-identified patent and that said Letters Patent is hereby corrected as shown below:

In column 6, line 4, delete "PPM" and insert -- PRM --, therefor.

In column 6, line 8, delete "PPM" and insert -- PRM --, therefor.

In column 6, line 9, delete "PPMD" and insert -- PRMD --, therefor.

In column 6, line 14, delete "PPM" and insert -- PRM --, therefor.

In column 14, line 37, in Claim 17, after "structure" insert -- further --.

Signed and Sealed this

Twenty-third Day of June, 2009

JOHN DOLL
*Acting Director of the United States Patent and Trademark Office*